United States Patent
Shah et al.

(10) Patent No.: US 10,484,876 B2
(45) Date of Patent: Nov. 19, 2019

(54) ASSISTED DYNAMIC FREQUENCY SCAN FOR WI-FI ACCESS POINTS

(71) Applicant: Verizon Patent and Licensing Inc., Arlington, VA (US)

(72) Inventors: Jeemil Shah, Santa Clara, CA (US); Arun Kalmanje, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 132 days.

(21) Appl. No.: 15/594,419

(22) Filed: May 12, 2017

(65) Prior Publication Data

US 2018/0332583 A1    Nov. 15, 2018

(51) Int. Cl.
| | |
|---|---|
| *H04W 16/14* | (2009.01) |
| *H04W 36/08* | (2009.01) |
| *H04W 16/10* | (2009.01) |
| *H04W 48/16* | (2009.01) |
| *H04W 24/02* | (2009.01) |
| *H04W 24/10* | (2009.01) |
| *H04W 84/12* | (2009.01) |
| *H04W 88/08* | (2009.01) |
| *H04W 72/04* | (2009.01) |

(52) U.S. Cl.
CPC .......... *H04W 16/14* (2013.01); *H04W 16/10* (2013.01); *H04W 24/02* (2013.01); *H04W 24/10* (2013.01); *H04W 36/08* (2013.01); *H04W 48/16* (2013.01); *H04W 72/0453* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,524,280 A * | 6/1996 | Douthitt | H03J 1/0091 455/513 |
| 2005/0288015 A1 * | 12/2005 | Azizi | H04W 48/16 455/434 |
| 2010/0061335 A1 * | 3/2010 | Kannan | H04W 36/0077 370/331 |
| 2018/0279130 A1 * | 9/2018 | Huang | H04W 24/02 |

* cited by examiner

*Primary Examiner* — Yaotang Wang (57) ABSTRACT

An access point (AP) may use historical Dynamic Frequency Selection (DFS) monitoring information to make a decision of whether to perform a DFS procedure on a particular channel. The historical information can be obtained from other APs, such as from other nearby APs. In this manner, historical DFS monitoring information, which was previously measured by the AP or by a nearby AP, can be used to improve the likelihood that a decision to perform the DFS procedure will result in a determination that a particular channel is useable.

20 Claims, 7 Drawing Sheets

| AP Identifier | AP Location | DFS Channel Scan Information |
|---|---|---|
| AP1 | lat = 44.240309, long = -91.493619 | <Channel_X, Scan_Result, Timestamp> |
| AP2 | lat = 33.844847, long = -116.549069 | <Channel_X, Scan_Result, Timestamp> |
| AP3 | lat = 44.240308, long = -91.4937 | <Channel_X, Scan_Result, Timestamp> |
| ••• | ••• | ••• |

510 → AP Identifier
520 → AP Location
530 → DFS Channel Scan Information
500

ASSISTED DYNAMIC FREQUENCY SCAN FOR WI-FI ACCESS POINTS

BACKGROUND

Wi-Fi is a technology for wireless local area networking based on the Institute of Electrical and Electronics Engineers (IEEE) 802.11 standards. Devices that can use Wi-Fi technology include personal computers, video-game consoles, smartphones, digital cameras, tablet computers, digital audio players, and modern printers. Wi-Fi compatible devices can connect to the Internet via a Wireless Local Area Network (WLAN) network and a wireless Access Point (AP).

Wi-Fi devices typically operate using two unlicensed bands: the 2.4 Gigahertz (GHz) band and the 5 GHz band. The 5 GHz band is shared by other non-Wi-Fi devices, such as weather radars. In many countries, Wi-Fi systems operating in the 5 GHz band are required to employ a radar detection and avoidance capability. One such avoidance capability is known as Dynamic Frequency Selection (DFS). As per the 802.11 specifications, if an AP wishes to operate or re-enter a DFS channel (i.e., a frequency channel in the 5 GHz band that may be used by other systems, such as radar), the AP is required to monitor the DFS channel of interest for a specified time period (e.g., n minutes) before it can use the channel for data transmission. The value of n may typically be between one and 10 minutes. When a radar pulse is detected, the AP must exit the channel. The monitoring and subsequent re-entry of the DFS channel may be repeated every time a radar pulse is detected.

Use of the DFS channels for Wi-Fi communications is desirable, as these channels may tend to be less crowded and provide relatively high performance. However, the requirement of monitoring the DFS channels for a specific duration can be expensive in terms of radio resources and time. Additionally, certain locations, such as those in proximity to weather stations or airports, may not be practically useable with DFS channels, as the high periodicity of the occurrence of DFS events in these locations may result in a poor Wi-Fi experience.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Figure 1:
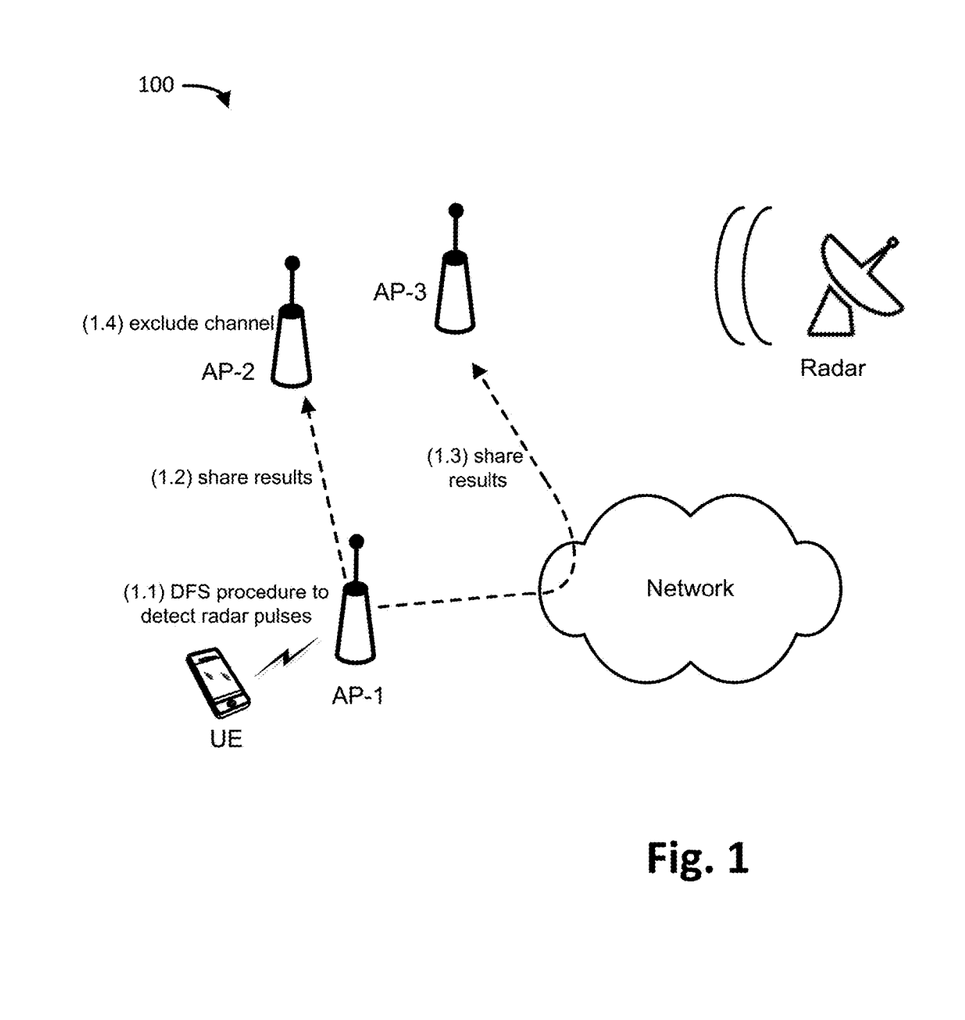
FIG. 1 illustrates an example overview of an implementation described herein.

FIG. 1 is a diagram conceptually illustrating an overview of concepts consistent with those described herein. As illustrated, a number of Wi-Fi access points (AP-1, AP-2, and AP-3) may be used to provide Wi-Fi service to client devices, such as a smartphone (User Equipment (UE)). Each Wi-Fi AP may provide Wi-Fi service using, for example, the 2.4 GHz and/or 5 GHz unlicensed bands. Some of the channels in the 5 GHz band may be channels for which DFS is required before the APs are permitted to use the channel. For example, a portion of the 5 GHz band may be intermittently used by radar systems.

The APs may connect, via a wired or wireless connection, to a network. The network may be, for example, a backbone network, such as a wide area network that provides Internet connectivity to the APs.

With the existing DFS procedure, an AP, before using a frequency band (e.g., a 5 GHz band that may be used by local radar systems), may first be required to monitor the channel for a designated time period (e.g., n minutes). The AP may only use the channel if, during the time period, no activity is detected from a device (e.g., a radar) that is covered by the DFS procedure. The requirement of monitoring the DFS channels for the specific duration can be expensive in terms of radio resources and time.

Consistent with aspects described herein, the AP may use historical DFS monitoring information to determine whether to perform the DFS procedure on a particular channel. In some implementations, the historical information can be obtained from other APs, such as from other nearby APs. In this manner, historical DFS monitoring information (i.e., DFS monitoring information that was previously performed), which was previously obtained by the AP or by a nearby AP, can be used to improve the likelihood that a decision to perform the DFS procedure will result in a determination that a particular channel is useable.

As shown in FIG. 1, assume that AP-1, before using the 5 GHz band for Wi-Fi communications, performs the DFS procedure on a particular channel or set of channels in the 5 GHz band. For example, AP-1, before using a channel, may monitor the channel (for a predetermined time period) for radar pulses (at 1.1, "DFS procedure to detect radar pulses"). AP-1 may transmit the result of the monitoring to AP-2 (at 1.2, "share results"). The communication from AP-1 to AP-2 may be performed through direct AP-to-AP communications, such as via Wi-Fi beacon or probe frames, or via Wi-Fi direct communications. AP-1 may also transmit the result of the monitoring to AP-3 (at 1.3, "share results"). The communication from AP-1 to AP-3 may be performed using the network, such as via packet-based communications that are routed through the network. In various implementations, either or both the direct and network-based techniques may be used to share the DFS monitoring information.

In the illustrated example, assume that the communication from AP-1 to AP-2 indicates that a radar is detected as being active on a particular channel. Based on this information, AP-2 may determine, without having to itself perform the DFS procedure, that the particular channel is likely to not be eligible to be used as a Wi-Fi channel (at 1.4, "exclude channel"). In this manner, by sharing DFS measurements with other nearby APs, the APs can optimize the use of resources in performing the DFS procedure.

Figure 2:
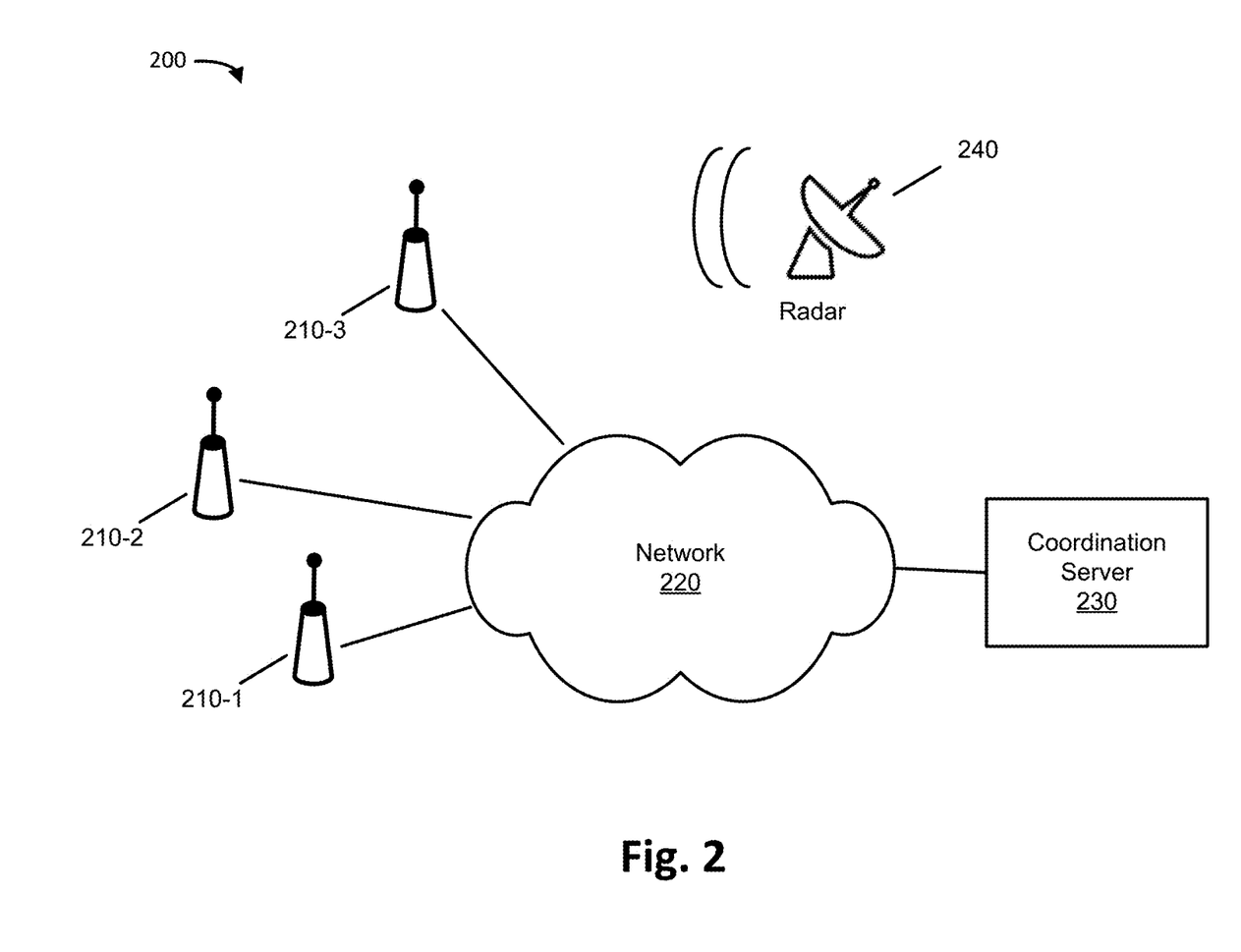
FIG. 2 illustrates an example environment in which systems and/or methods described herein may be implemented.

FIG. 2 illustrates an example environment 200 in which systems and/or methods described herein may be implemented. Environment 200 may include APs 210 (shown as APs 210-1, 210-2, and 210-3), network 220, coordination server 230, and radar system 240. Although three APs 210 are illustrated in environment 200, it can be appreciated that this number is exemplary.

APs 210 may represent access points for Wi-Fi (e.g., IEEE 802.11 standards-based APs). Each AP 210 may be a networking hardware device that allows a Wi-Fi complying device (a Wi-Fi client device) to connect to AP 210. AP 210 may additionally connect to network 220 to thus provide the Wi-Fi client device with a connection to network 220. Typically, APs 210 connect to client devices using a wireless interface (e.g., using the 2.4 GHz or 5 GHz frequency bands) and connect to network 220 using a wired connection. In some implementations, APs 210 may independently provide network connectivity to clients. For example, each of APs 210 may be an AP provided to a residential end-user and that provides a wireless local area network (WLAN) for the end-user. Alternatively, or additionally, in some embodiments, several APs 210 may be managed by a controller (not shown) to provide a single logical WLAN. For example, a corporate network may use multiple APs 210 that together provide a wireless mobility group that allows client devices to be provided with a single logical WLAN throughout a regional office location.

Network 220 may include one or more wired and/or wireless networks that provide broadband connectivity to APs 210. For example, network 220 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 220 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. Network 220 may provide network connectivity (e.g., an Internet connection) to client devices that attach to APs 210.

Coordination server 230 may include one or more computing devices that may manage the coordination of APs 210 in sharing historical DFS monitoring information. In one embodiment, coordination server 230 may maintain an indication of the geographical location of each of APs 210. APs 210 may transmit measurements relating to the historical DFS monitoring information. Coordination server 230 may use the received DFS monitoring information and the geographic location information of APs 210 to determine historical DFS monitoring information that is relevant to particular APs 210. For example, coordination server 230 may forward historical DFS monitoring information, received from a first AP 210, to any other APs 210 that are within a particular threshold distance to the first AP 210. As another example, coordination server 230 may use more advanced analytical techniques to determine the particular set of APs for which the corresponding historical DFS monitoring information may be transmitted to another AP. For example, known information about the location of airports and/or weather radar systems may be used in the determination.

In some embodiments, coordination server 230 may serve as a coordination point via which APs 210 may connect and obtain network addresses of other nearby APs. In this implementation, the APs may then directly communicate with one another to exchange the historical DFS information.

Alternatively, in some embodiments, coordination server 230 may not be used. Instead, APs 210 may be configured to directly communicate with one another. For example, Wi-Fi broadcast frames may be used to share historical DFS monitoring information with other nearby APs.

Radar system 240 may represent a weather radar, radar used as part of aircraft flight control, or any other system that is covered by the radar detection and avoidance provisions of the Wi-Fi standards. In general, radar activity associated with radar system 240 may cause DFS procedures, performed by APs 210, to result in certain DFS channels to be prohibited for use by APs 210.

Figure 3:
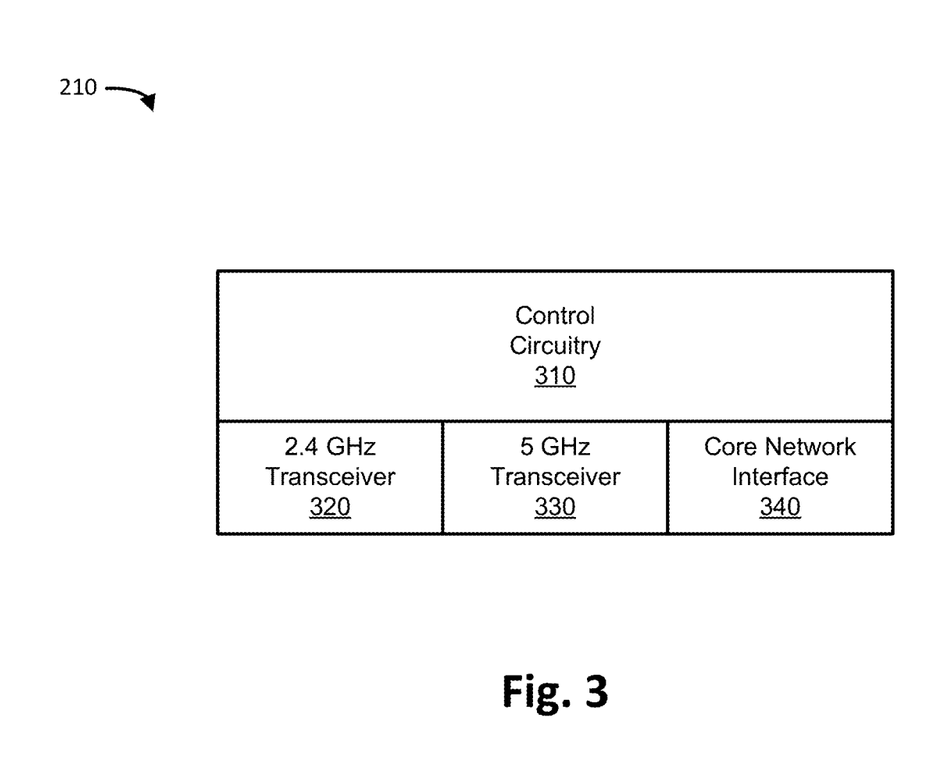
FIG. 3 is a diagram conceptually illustrating an example embodiment of an AP.

FIG. 3 is a diagram conceptually illustrating an example embodiment of one of APs 210. As illustrated, AP 210 may include control circuitry 310, 2.4 GHz transceiver 320, 5 GHz transceiver 330, and core network interface 340.

Control circuitry 310 may include one or more processors, Application Specific Integrated Circuits (ASICs), and/or memories that execute one or more software or firmware programs, a combinational logic circuit, and/or other suitable software or hardware components. In some embodiments, the control circuitry may be implemented in, or functions associated with the control circuitry may be implemented by, one or more software or firmware modules. In some embodiments, the control circuitry may include logic, at least partially operable in hardware. The memory may include, for example, a computer-readable medium, which may be a non-transitory computer-readable medium. The computer-readable medium may store processor-executable instructions that, when executed by control circuitry 310, may control the implementation of certain aspects of the functionality described herein. Control circuitry 310 may generally control the operation of AP 210.

2.4 GHz transceiver 320 and 5 GHz transceiver 330 may include radio frequency (RF) circuitry and/or antennas for communicating in the 2.4 GHz and 4 GHz unlicensed bands, respectively. 5 GHz transceiver 330 may include circuitry for measuring and/or listening for the presence of devices associated with radar system 240 (e.g., listening for the presence of radar pulses). 2.4 GHz transceiver 320 and 5 GHz transceiver 330 may be controlled by control circuitry 310 to implement the Wi-Fi radio interfaces. Core network interface 340 may include circuitry to implement a physical interface with network 220. In one embodiment, core network interface 340 may connect to network 220 using a wired interface (e.g., an Ethernet cable, a fiber link, etc.). Alternatively, or additionally, core network interface 340 may provide a wireless interface to network 220, such as via a microwave link, a cellular radio link, or other wireless link.

The quantity of devices and/or networks, illustrated in FIGS. 2 and 3, is provided for explanatory purposes only. In practice, environment 200 and AP 210 may include additional devices and/or networks; fewer devices and/or networks; different devices and/or networks; or differently arranged devices and/or networks than illustrated in FIGS. 2 and 3. For example, while not shown, environment 200 may include devices that facilitate or enable communication between various components shown in environment 200, such as routers, modems, gateways, switches, hubs, etc.

Figure 4:
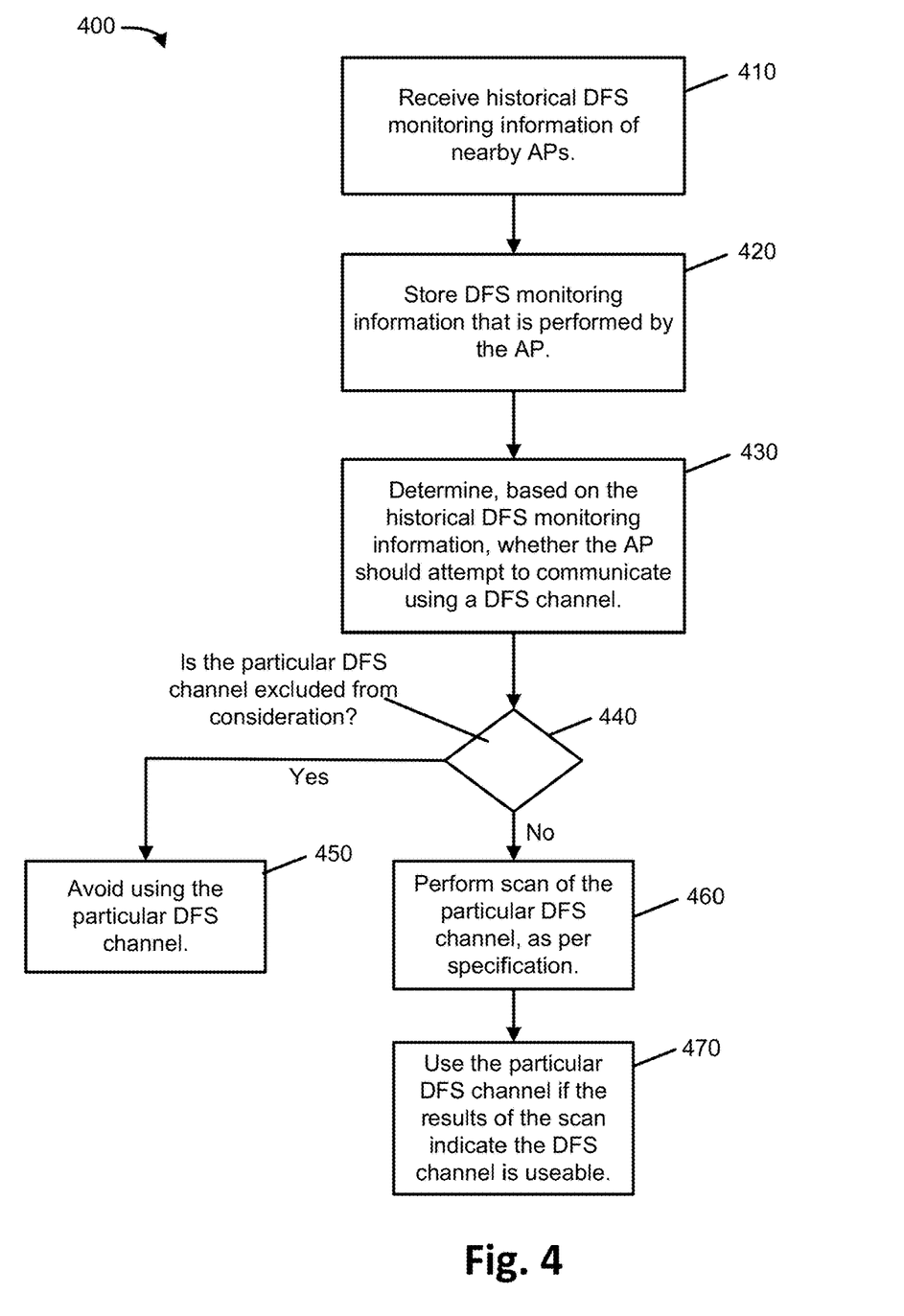
FIG. 4 is a flowchart illustrating an example process for using historical DFS monitoring information.

FIG. 4 is a flowchart illustrating an example process 400 for using historical DFS monitoring information when using DFS channels. Process 400 may be implemented by, for example, AP 210.

Process 400 may include receiving historical DFS monitoring information of nearby APs 210 (block 410). The historical DFS monitoring information may include an indication of the result of the scanning of particular DFS channels. For example, the information may include an indication of particular DFS channels that were scanned and for which radar signals were detected, particular DFS channels that were scanned and for which no radar signals were detected, and/or the date/time of the scans. In some implementations, the location of the nearby AP 210 (e.g., as latitude/longitude coordinate data) that performed a particular scan may be included with the indication of each scan.

In some embodiments, the historical DFS monitoring information may be directly exchanged with other APs 210 using Wi-Fi broadcast frames. In other embodiments, the historical DFS monitoring information may be aggregated by coordination server 230 and transmitted to APs 210 as needed.

AP 210 may also store DFS monitoring information obtained by AP 210 itself (block 420). Thus, whenever AP 210 performs a scan of the DFS channel, as per the Wi-Fi specifications, AP 210 may store the result of the scan. In this manner, AP 210 may subsequently use historical DFS monitoring information obtained by AP 210 itself and by other nearby APs 210.

Process 400 may further include determining, based on the historical DFS monitoring information, whether the AP should attempt to communicate using a DFS channel (block 430). The historical DFS monitoring information may include both the information received from nearby APs (e.g., in block 410) and the information obtained by the AP itself (e.g., in block 420).

A number of potential techniques can be used to make the determination of block 430. For example, in one embodiment, AP 210 may refrain from scanning a particular DFS channel when a radar pulse was previously detected by AP 210 or by any other AP that is within a certain threshold distance from AP 210. The previous detection may be limited to within a particular historical time window (e.g., one day). As another example, AP 210 may refrain from scanning a particular DFS channel if a predetermined threshold number or portion of prior scans detected a radar pulse. For example, if more than 20% of the historical DFS scans for a particular DFS channel detected a radar pulse within the last week, the channel may be excluded from further consideration by AP 210. As yet another example, more advanced techniques can be used to estimate the source location of a radar system. For example, patterns of detected radar pulses, as detected by multiple APs at different locations, may be used to estimate a source location of the radar system. In this scenario, the distance from the estimated location of the radar system and AP 210 may be used to estimate whether the radar system is likely to negatively affect the operation AP 210.

Process 400 may further include determining whether a particular DFS channel has been excluded from consideration for use (block 440). In one embodiment, the determination made in block 430 may result in the setting of an "exclusion" flag, for each possible DFS channel, where when the exclusion flag is set, AP 210 will refrain from performing a scan of the DFS channel. In some implementations, the flag may be reset after a predetermined time period (e.g., one day).

Process 400 may further include, when a particular DFS channel is excluded from consideration (block 440—YES), avoiding the use of the DFS channel (block 450). On the other hand, when the particular DFS channel is not excluded from consideration (block 440—NO), the AP may potentially use the channel. In this situation, use of the DFS channel may initially require performance of the scan of the DFS channel, as per the Wi-Fi specification (block 460). If the channel passes the scan (e.g., no radar pulse is detected in the scanning), AP 210 may use the DFS channel (block 470).

Although process 400 was generally described as being performed by AP 210, in some embodiments, a number of the operations of process 400 could be performed by coordination server 230. For instance, coordination server 230 may aggregate historical DFS monitoring information, from multiple APs, and may calculate, for each particular AP 210, whether a particular DFS channel should be excluded from consideration by the particular AP. In this implementation, coordination server 230 may transmit, for each particular AP, an indication of which DFS channels should be excluded from consideration by the particular AP.

Figure 5:
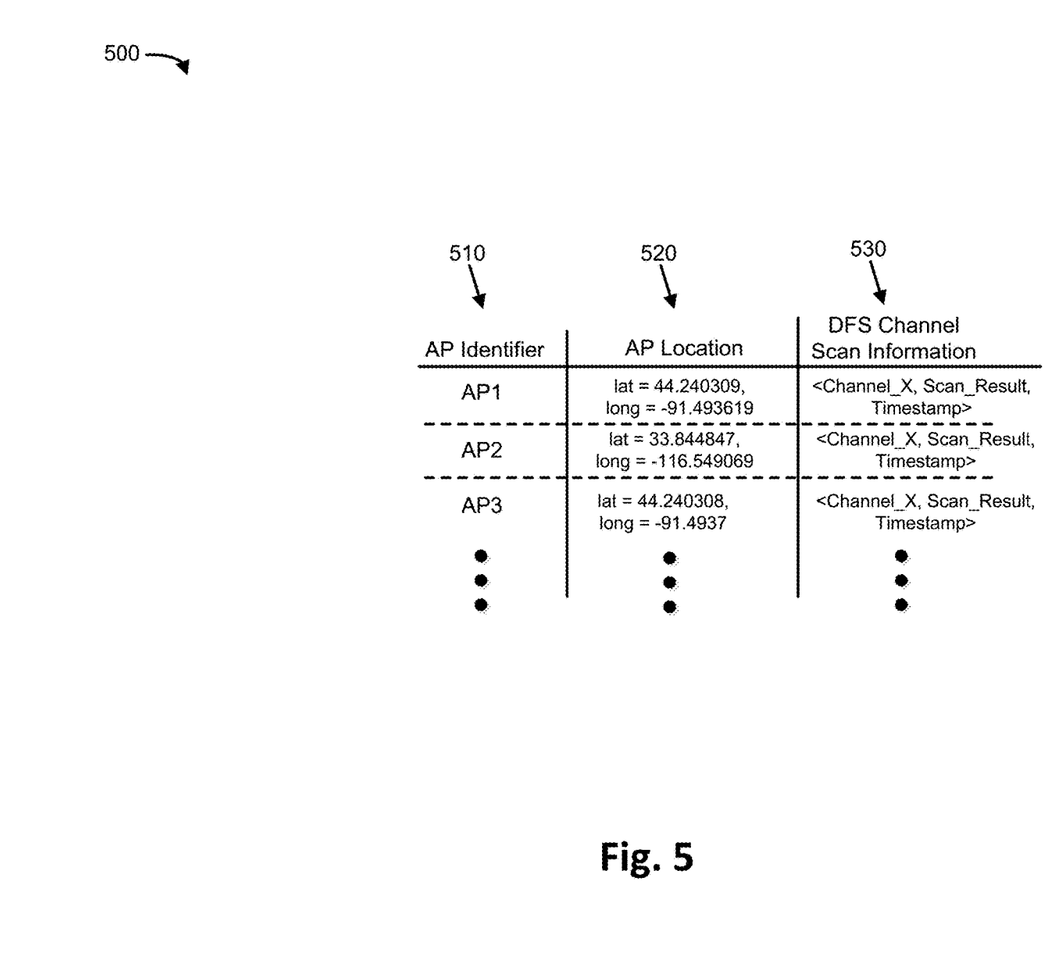
FIG. 5 is a diagram illustrating example data structure that may be stored by a coordination server.

As previously mentioned, in some embodiments, coordination server 230 may assist in the determination of whether a particular AP 210 should exclude certain DFS channels for consideration. FIG. 5 is a diagram illustrating example data structure 500 that may be stored by coordination server 230. Data structure 500 may generally be used to track the historical DFS channel scanning results from a number of APs 210.

As illustrated, data structure 500 may include a number of records, each of which may be associated with a particular AP 210. Each record may include AP identifier field 510, AP location field 520, and DFS channel scan information field 530. AP identifier field 510 may include a unique identifier associated with each AP 210, such as a MAC (Media Access Control) identifier, Internet Protocol (IP) address, or other identifier. AP location field 520 may store the location of the corresponding AP. The location value may be stored as, for example, geographic coordinate information (e.g., latitude and longitude values), a street address, or other values that indicate geographic location. DFS channel scan information field 530 may store the historical DFS monitoring information that was received from the AP. For example, DFS channel scan information field 530 may include a list of data structures, where each data structure may correspond to the result of a DFS scan that was made by the corresponding AP. For example, as illustrated, each data structure may include an indication of the DFS channel ("channel_x"), the result of the scan (e.g., whether radar pulse was detected, "scan_result"), and a timestamp indicating the date and time of the scan ("timestamp"). The fields indicated for data structure 500 are exemplary. In other embodiments, different or additional fields may be used.

As mentioned previously, in some embodiments, the historical DFS monitoring information may be delivered to APs 210 by coordination server 230. Alternatively, or additionally, coordination server 230 may coordinate the communication of APs 210 to allow the APs to directly communicate with one another to exchange historical DFS monitoring information.

Instead of using coordination server 230, in some embodiments, APs 210 may coordinate with one another in an ad-hoc manner and/or may broadcast the historical DFS monitoring information to one another using Wi-Fi communications. For example, beacon or broadcast frames may be used to share the historical DFS monitoring information.

As described above, historical information received from other APs may be used to improve the scanning of certain 5 GHz channels to enable Wi-Fi to coexist with non-Wi-Fi systems, such as radar. As will next be described in more detail below, in alternative or additional embodiments, APs 210 may additionally use AP historical scan information to improve the channel switch process for an AP.

When scanning for open channels, including channels not subject to the DFS procedure, APs 210 may perform two types of scanning: (1) Passive Scan and (2) Active Scan. In the passive scan procedure, AP 210 may stay on a particular channel for a time duration of 100 milli-seconds (ms) and listen to beacon frames transmitted by other APs on the channel. No transmission is performed in the passive scan process. In the active scan process, a broadcast probe request is transmitted over the particular channel. APs that receive the broadcast probe on the particular channel may respond. The minimum dwell time (i.e., the time that the broadcasting AP may need to stay on the channel) for the active procedure is defined, per the Wi-Fi specifications, as 10 ms. After selecting a channel, the AP may keep performing channel scan using either the passive scan procedure or the active scan procedure. This can result in wastage of radio resources in which time is spent scanning a channel of non-importance.

Consistent with additional aspects described herein, historical scan information may be used to modify the dwell time that AP 210 devotes to the scanning of different channels. The term "dwell time," as used herein, may refer to the time period that AP 210 spends scanning (either via the active or passive scan procedure) of a particular channel. For example, AP 210 may use historical scan information to form a weighted system of dwell times to allocate to each channel based on the current ranking status of each channel. In other words, the dwell times may be varied on a per-channel basis. Channels that are more likely to be useful channels (or that otherwise are ranked higher) may be assigned larger dwell times and therefore associated with higher radio resource usage when determining the channel status (e.g., with regard to interference and data activity on the channel).

Figure 6:
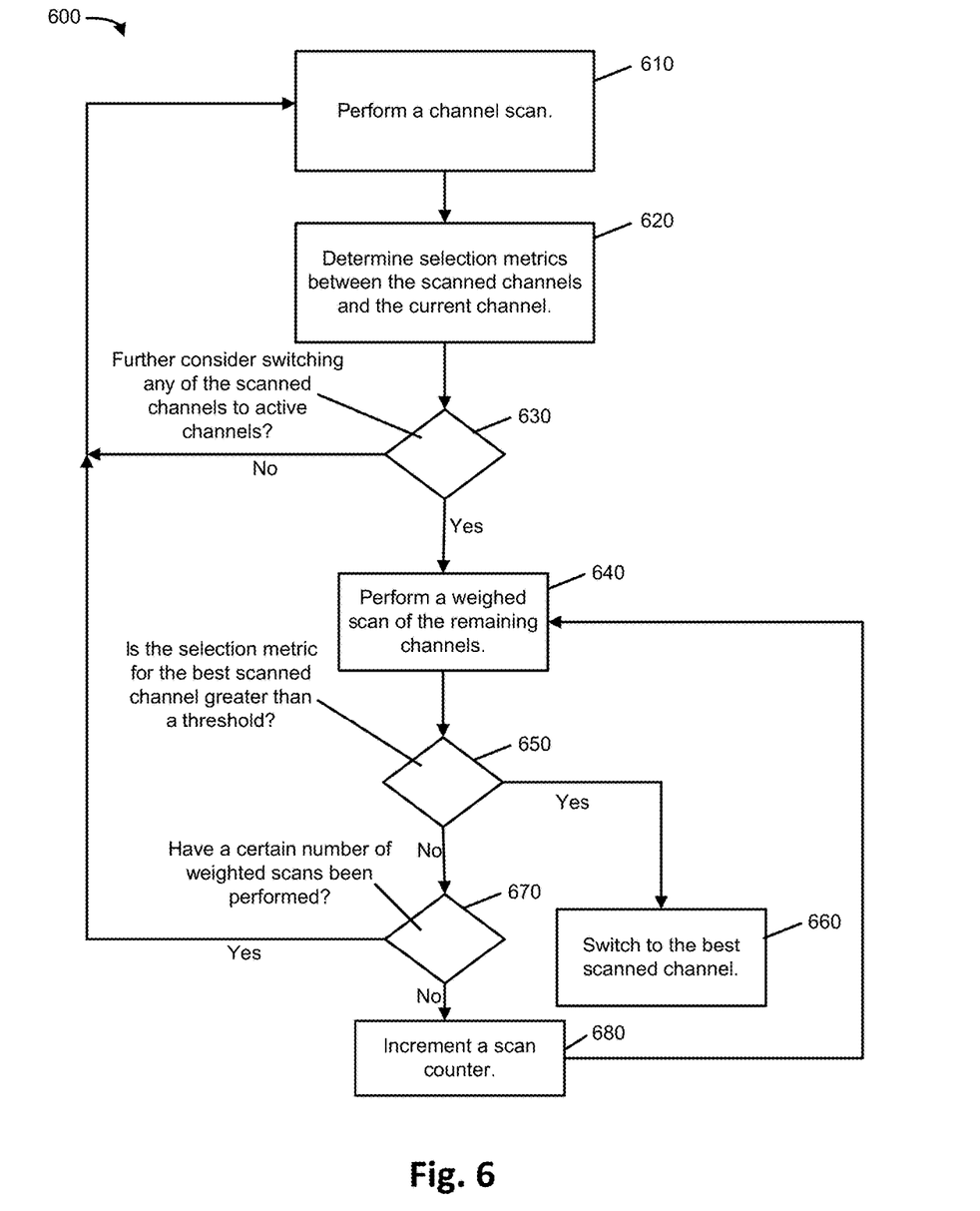
FIG. 6 is a flowchart illustrating an example process for using AP historical scan information to improve channel selection.

FIG. 6 is a flowchart illustrating an example process 600 for using AP historical scan information to improve channel selection. Process 600 may be performed by, for example, AP 210.

Process 600 may include performing a channel scan (block 610). The channel scan may be performed using the active and/or passive channel scan procedure and may be performed using existing techniques. For example, AP 210 may scan all potential channels using the default dwell times assigned to each of the channels. In one implementation, the default dwell times may be equal for all channels (i.e., equal radio resources are expended when scanning each of the potential channels).

Based on the results of the scan, AP 210 may determine selection metrics between the scanned channels and the current channel being utilized by AP 210 (block 620). The selection metrics may indicate, for instance, for each scanned channel, the effectiveness and/or capacity of the scanned channel relative to the current channel. The selection metrics may be used to determine whether AP 210 should switch the current (active) channel of AP 210 to another channel. The selection metrics may be based on, for example, channel interference with other APs or with other sources of interference.

Process 600 may further include determining whether any of the scanned channels should be further considered for being switched to an active channel (block 630). For example, AP 210 may, for each scanned channel, compare the selection metric to a threshold and, when the selection metric exceeds this threshold, further consider the channel as a potential candidate to which the AP should switch. In this manner, channels that are likely to provide more than a threshold level of performance improvement may be considered as a possible switching candidate. When there are no scanned channels that are to be further considered for switching (block 630—NO), process 600 may return to the operations of block 610 (potentially after a predetermined wait period).

When there are scanned channels that are to be further considered for switching (block 630—YES), process 600 may further include performing a weighted scan of the remaining channels (block 640). The weighted scan may be performed using different dwell times for the channels. For example, in one possible implementation, the total desired dwell time for the scan may be apportioned among the channels in proportion to the values of the selection metrics for the channels. In other implementations, other techniques may be used. For example, the scan may use the same total amount of radio resources as the scan performed in block 610, but because the number of channels under consideration is potentially reduced, more radio resources can be devoted to each channel.

Process 600 may further include determining, based on the scan performed in block 640, whether the best channel (e.g., the channel with the highest selection metric value) has a selection metric value greater than a threshold (block 650). When the selection metric value is greater than the threshold (block 650—YES), process 600 may include initiating the switch to that channel (block 660).

When the selection metric value is not greater than the threshold (block 650—NO), process 600 may include determining whether a certain (threshold) number of weighted scans have been performed (block 670). When the threshold number of weighted scans have been performed (block 670—YES), process 600 may include resetting the weighting scale by performing the initial scan of all of the potential channels. When the threshold number of weighted scans have not been performed (block 670—NO), process 600 may include incrementing a scan counter before again performing the weighted scan (block 680).

As will be described next, in another embodiment, client bandwidth capability information may be used to determine future channel selection.

As mentioned above, in Wi-Fi, wireless radios typically operate in two possible bands: 2.4 GHz and 5 GHz. Depending on the band there are number of non-overlapping channels. Additionally, channel bonding may be used to simultaneously utilize multiple channels as a single logical channel. Channel bonding, however, may decrease the number of channels available for performing a channel switch. Additionally, there is frequently an asymmetry between the AP capabilities and the client devices. For instance, many client devices do not have the same performance capabilities as the AP. Existing APs tend to select channels based on the highest capability of the AP, even if the client device cannot fully utilize the selected channel.

In one embodiment, a history of new client device associated with a particular AP may be maintained. During a channel switch operation, the AP may use this information when determining an optimum channel for the client device. For example, a particular client may consistently obtain higher throughput when using a first channel relative to a second channel, even though the first and second channel may theoretically enable the same throughput. As a result, the AP may make channel selection choices based on immediate client needs, resulting in better channel selection. This process in turn may improve throughput for the associated clients as selected channel would have higher probability of lesser congestion.

Figure 7:
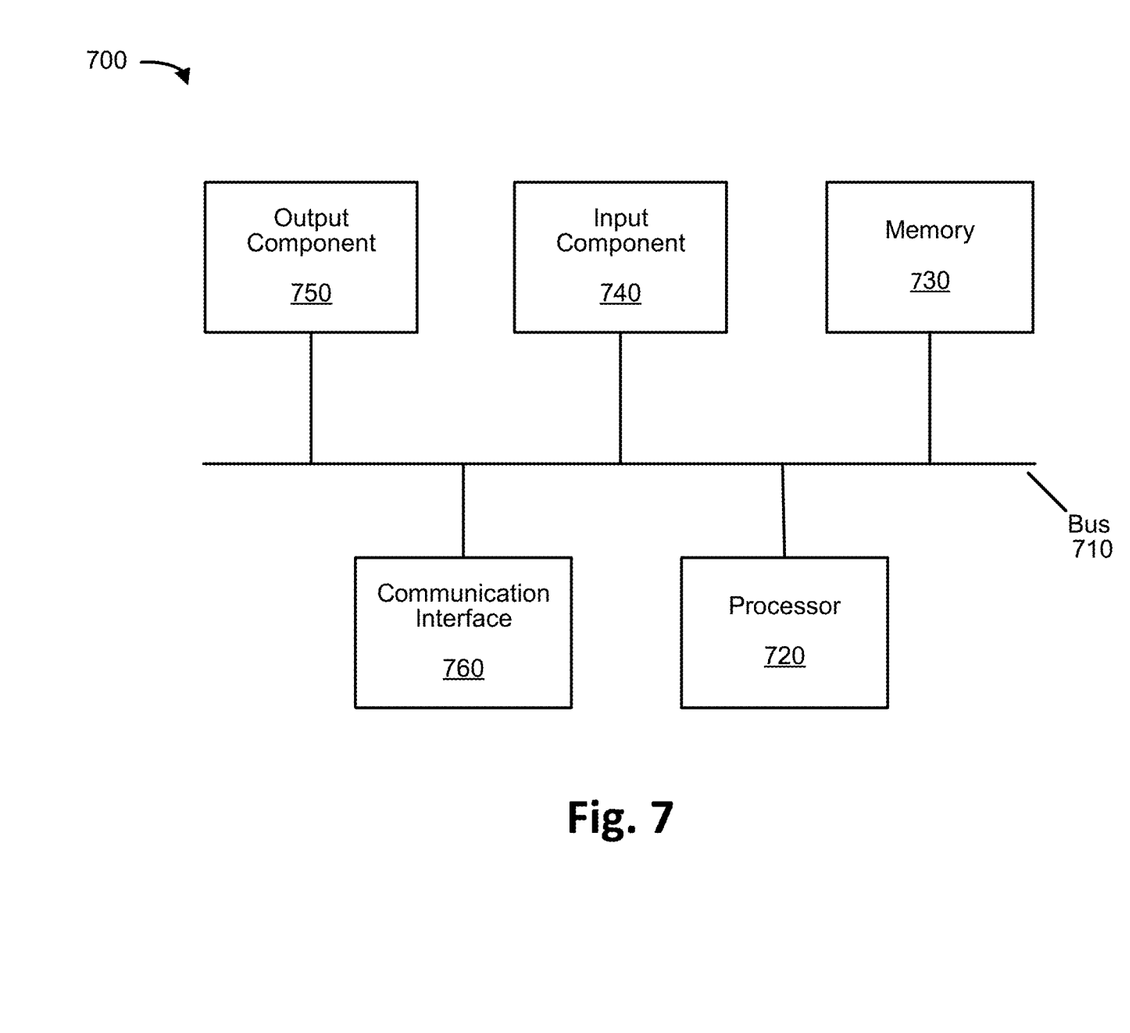
FIG. 7 is a block diagram of example components of a device.

FIG. 7 is a diagram of example components of a device 700. Device 700 may represent AP 210 (relative to FIG. 3), coordination server 230, or another device. Device 700 may include bus 710, processor 720, memory 730, input component 740, output component 750, and communication interface 760. In another implementation, device 700 may include additional, fewer, different, or differently arranged components. As described herein, a component may be implemented by hardware circuitry, software logic, and/or some combination thereof.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 4 and 6, the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. An access point (AP) comprising:
a radio transceiver to implement Wi-Fi radio connections in a 5 gigahertz (GHz) unlicensed band using a plurality of potential frequency channels;
a network interface to connect to a network that provides network connectivity to the AP; and
circuitry to:
receive historical channel scan information relating to results of scans of the plurality of potential frequency channels by other APs;
determine, based on the historical channel scan information, one or more of the plurality of potential frequency channels to exclude as a potential active Wi-Fi channel for the AP;
select from the plurality of potential frequency channels to obtain one or more of the plurality of potential channels to scan, the selecting including refraining from selecting any of the plurality of potential frequency channels that were determined to be excluded;
determine, for each of the selected potential frequency channels, one or more selection metrics;
determine, for each of the selected potential frequency channels and based on the one or more selection metrics, an amount of time to scan each of the selected potential frequency channels,
wherein a first amount of time is determined for a first potential frequency channel, of the selected potential frequency channels based on the one or more selection metrics associated with the first potential frequency channel, and
wherein a second amount of time is determined for a second potential frequency channel, of the selected potential frequency channels based on the one or more selection metrics associated with the second potential frequency channel, the first and second amounts of time being different; and
scan the selected potential frequency channels over a particular period of time, without scanning any of the plurality of potential frequency channels that were determined to be excluded, wherein scanning the selected potential frequency channels includes:
scanning, during the particular period of time, the first potential frequency channel for the first amount of time, and
scanning, during the particular period of time, the second potential frequency channel for the different second amount of time.

2. The AP of claim 1, wherein the circuitry is further to:
transmit results of the scanning of the selected potential frequency channels to the other APs.

3. The AP of claim 2, wherein when transmitting the results to the other APs, the circuitry is further to:
directly transmit the results of the scanning, to the other APs, using Wi-Fi beacons or broadcast frames.

4. The AP of claim 2, wherein when transmitting the results to the other APs, the circuitry is further to:
transmit the results of the scanning, to the other APs, by transmitting the results of the scanning to a coordination server that coordinates the exchange of the historical channel scan information among APs based on relative locations of the APs.

5. The AP of claim 1, wherein the other APs, from which the historical channel scan information is received, include APs that are within a threshold geographic distance from the AP.

6. The AP of claim 1, wherein the scanning of the selected potential frequency channels includes performing a Dynamic Frequency Selection (DFS) procedure on the selected potential frequency channels to determine whether a radar pulse is detected.

7. The AP of claim 1, wherein the circuitry is further to:
receive the historical channel scan information, from a coordination server, as an indication of the one or more of the plurality of potential frequency channels to exclude.

8. The AP of claim 1, wherein the circuitry is further to:
switch an active frequency channel, of the AP, based on the scanning of the selected potential frequency channels.

9. A method, performed by a Wi-Fi Access Point (AP), the method comprising:
receiving historical channel scan information relating to results of scans of a plurality of potential frequency channels, in a 5 gigahertz (GHz) Wi-Fi frequency band, the historical channel scan information having been obtained by other APs;
determining, based on the historical channel scan information, one or more of the plurality of potential frequency channels to exclude as a potential active Wi-Fi channel for the AP;
selecting from the plurality of potential frequency channels to obtain one or more of the plurality of potential channels to scan, the selecting including refraining from selecting any of the plurality of potential frequency channels that were determined to be excluded;
determining, for each of the selected potential frequency channels, one or more selection metrics;
determining, for each of the selected potential frequency channels and based on the one or more selection metrics, an amount of time to scan each of the selected potential frequency channels,
wherein a first amount of time is determined for a first potential frequency channel, of the selected potential frequency channels based on the one or more selection metrics associated with the first potential frequency channel, and
wherein a second amount of time is determined for a second potential frequency channel, of the selected potential frequency channels based on the one or more selection metrics associated with the second potential frequency channel, the first and second amounts of time being different; and
scanning the selected potential frequency channels, without scanning any of the plurality of potential frequency channels that were determined to be excluded, wherein scanning the selected potential frequency channels includes:
scanning, during the particular period of time, the first potential frequency channel for the first amount of time, and
scanning, during the particular period of time, the second potential frequency channel for the different second amount of time.

10. The method of claim 9, further comprising:
transmitting results of the scanning of the selected potential frequency channels to the other APs.

11. The method of claim 10, wherein when transmitting the results to the other APs, the method further includes:

directly transmitting the results of the scanning, to the other APs, using Wi-Fi beacon or broadcast frames.

12. The method of claim 10, wherein when transmitting the results to the other APs, the method further includes:
transmitting the results of the scanning, to the other APs, by transmitting the results of the scanning to a coordination server that coordinates the exchange of the historical channel scan information among APs based on relative locations of the APs.

13. The method of claim 9, wherein the other APs, from which the historical channel scan information is received, include APs that are within a threshold geographic distance from the AP.

14. The method of claim 9, wherein the scanning of the selected potential frequency channels includes performing a Dynamic Frequency Selection (DFS) procedure on the selected potential frequency channels to determine whether a radar pulse is detected.

15. The method of claim 9, further comprising:
receiving the historical channel scan information, from a coordination server, as an indication of the one or more of the plurality of potential frequency channels to exclude.

16. The method of claim 9, further comprising:
switching an active frequency channel, of the AP, based on the scanning of the selected potential frequency channels.

17. A non-transitory, computer-readable medium storing a plurality of processor-executable instructions, wherein executing the processor-executable instructions causes one or more processors, associated with an Access Point (AP), to:
receive historical channel scan information relating to results of scans of a plurality of potential frequency channels, in a 5 gigahertz (GHz) Wi-Fi frequency band, the historical channel scan information having been obtained by other APs;
determine, based on the historical channel scan information, one or more of the plurality of potential frequency channels to exclude as a potential active Wi-Fi channel for the AP;
select from the plurality of potential frequency channels to obtain one or more of the plurality of potential channels to scan, the selecting including refraining from selecting any of the plurality of potential frequency channels that were determined to be excluded;
determine, for each of the selected potential frequency channels, one or more selection metrics;
determine, for each of the selected potential frequency channels and based on the one or more selection metrics, an amount of time to scan each of the selected potential frequency channels,
wherein a first amount of time is determined for a first potential frequency channel, of the selected potential frequency channels based on the one or more selection metrics associated with the first potential frequency channel, and
wherein a second amount of time is determined for a second potential frequency channel, of the selected potential frequency channels based on the one or more selection metrics associated with the second potential frequency channel, the first and second amounts of time being different; and
scan the selected potential frequency channels, wherein scanning the selected Potential frequency channels includes:
scanning, during the particular period of time, the first potential frequency channel for the first amount of time, and
scanning, during the particular period of time, the second potential frequency channel for the different second amount of time.

18. The computer-readable medium of claim 17, further comprising:
transmitting results of the scanning of the selected potential frequency channels to the other APs.

19. The computer-readable medium of claim 18, wherein when transmitting the results to the other APs, the method further includes:
directly transmitting the results of the scanning, to the other APs, using Wi-Fi beacon or broadcast frames.

20. The computer-readable medium of claim 18, wherein when transmitting the results to the other APs, the method further includes:
transmitting the results of the scanning, to the other APs, by transmitting the results of the scanning to a coordination server.

* * * * *